Feb. 24, 1970  R. PORCELLO  3,497,227
STEERABLE STAIR CLIMBING VEHICLE
Filed June 18, 1968  2 Sheets-Sheet 2
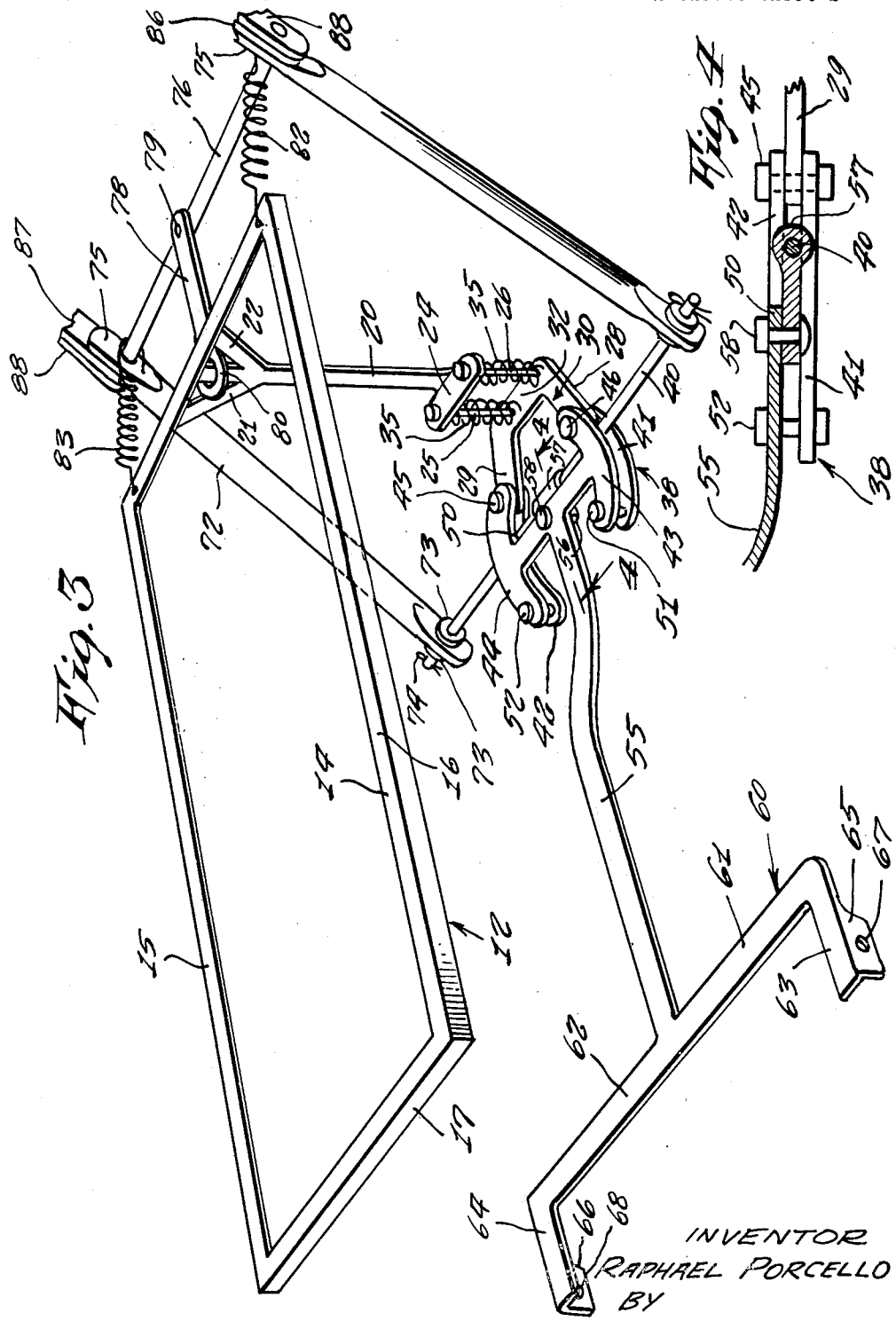
INVENTOR
RAPHAEL PORCELLO
BY
Carl Miller
ATTORNEY

United States Patent Office 3,497,227
Patented Feb. 24, 1970

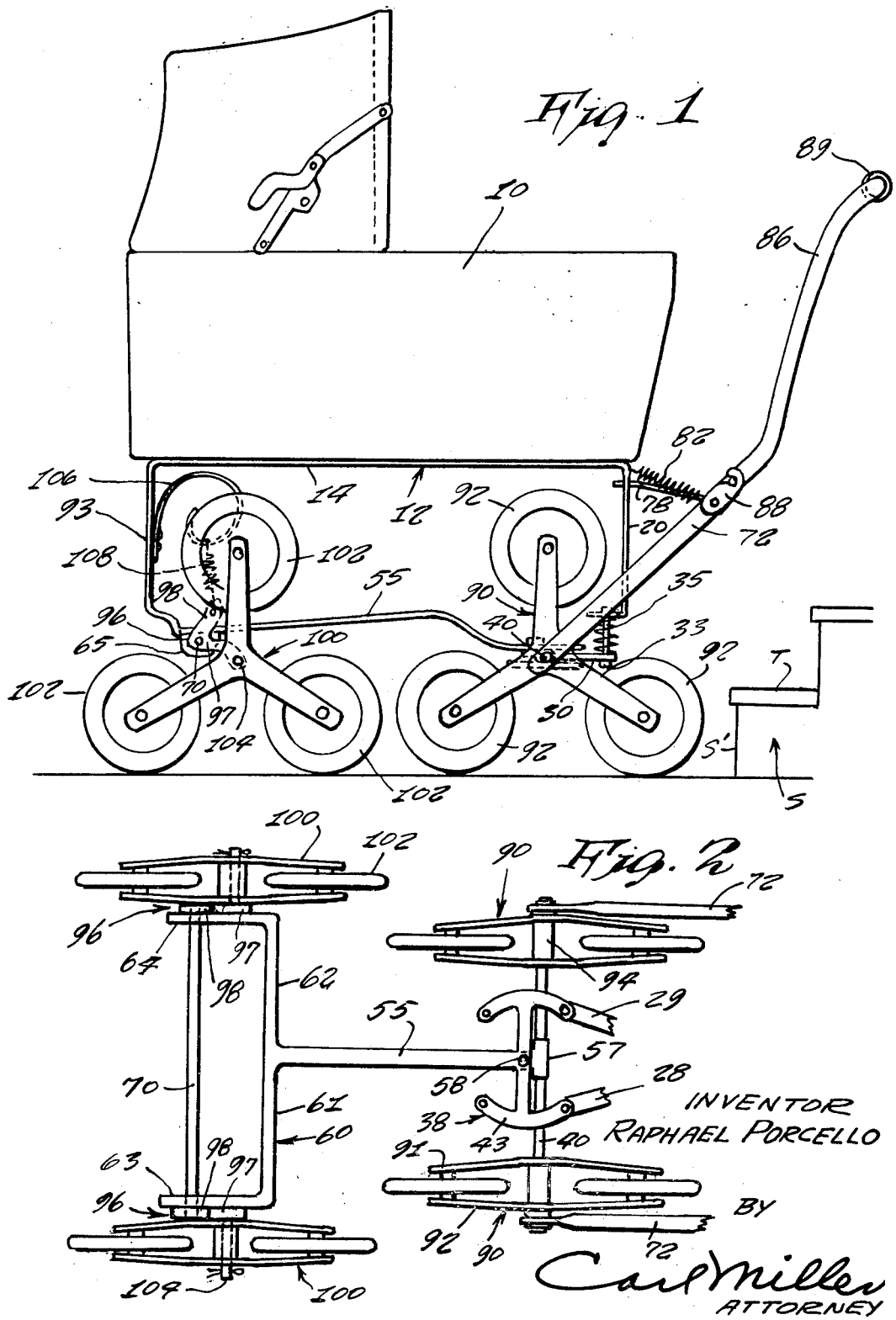

1

3,497,227
STEERABLE STAIR CLIMBING VEHICLE
Raphael Porcello, Knickerbocker Station, Box 286,
New York, N.Y. 10002
Filed June 18, 1968, Ser. No. 738,043
Int. Cl. B62b 9/02, 7/04
U.S. Cl. 280—5.26
10 Claims

ABSTRACT OF THE DISCLOSURE

A steerable stair climbing vehicle such as a baby carriage, cart or other body type having a supporting chassis frame. At the rear of the frame is a depending pedestal support resiliently supporting at its lower end a forwardly extending horizontal yoke. Connected to the forward arms of the yoke is a steering guide support which carries a rear axle centrally connected for lateral swinging movement about a steering pin mounted on the guide support. Push-pull arms having a latched foldable handle bar are secured at thin lower ends to the ends of the rear axle to effect desired steering movement thereof. Extending forwardly from the steering guide support is a rigid radius arm having bracket means at its forward end supporting a front axle. Brace means secure the bracket means to the chassis frame. A bell crank having a stub shaft is mounted on each of the terminal ends of the front axle, and spring elements connect each bell-crank to an adjacent brace. A three-arm spider having a rotatable wheel at the end of each arm of the spider is rotatably mounted on each stub shaft and also at each terminal end of the rear axle.

---

This invention relates to a wheeled vehicle such as a baby carriage, cart or other type of body and has for its primary object to provide a chassis support frame having a front axle and a steerable rear axle, each axle carrying a three-arm spider wheel support with each arm of the spider rotatably mounting a wheel such as to enable the vehicle to move up or down on its wheels on a stair curb or other surfaces differing in elevation.

A further object of this invention is to provide a steering guide support member for the rear axle to which the rear axle is pivoted by a steering pin and a pair of push-pull arms each connected to an end of the rear axle to effect desired turning thereof in the guide support member to steer the vehicle.

Another object of this invention is to provide the push-pull arms with a foldable handle bar which is latchable to lock the same in operative position to said push-pull arms.

Still another object of this invention is to provide a shock absorbing structure between the steering guide support and a pedestal carried by the chassis frame.

Yet another object of this invention is to provide a forwardly extending radius arm secured to the steering guide support and carrying at its front end the front vehicle axle, and carried by each end of the front axle is a bell-crank having a stub shaft on which is rotatably mounted a front wheel support.

Still another object of this invention is to resiliently connect each bell crank by a spring structure to the chassis frame.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described within the scope of the appended claims.

2

FIGURE 1 is a front side elevational view of the steerable stair climbing vehicle.

FIGURE 2 is a plan view of the chassis and wheeled structure.

FIGURE 3 is a perspective view of the chassis illustrating in detail the rear axle steering mount.

FIGURE 4 is a detail sectional view taken on line 4—4, FIGURE 3.

Referring now in detail to the drawings, the vehicle made in accordance with my invention is shown as a hand propelled baby carriage though it may be a truck or other form of conveyance. In FIGURE 1, a conventional form of baby carriage body 10 is suitably mounted on a horizontal chassis 12 consisting of a rectangular frame 14 preferably formed of angle bars including side frame members 15, 16, a front member 17 and a rear member 18.

Rigidly secured in any desired manner as by welding (not shown) is a vertical pedestal 20 arranged centrally of the rear frame member 18 and held in fixed position against lateral movement by angle braces 21, 22. At the base of pedestal 20 is a forwardly directed flange or bracket 24 that extends beyond each side edge of pedestal 20. A pair of bolts 25, 26 depend from flange bracket 24 being supported thereon by the heads of the bolts in the manner shown. A yoke 28 having forwardly extending arms 29, 30 and a bight portion 32 is supported at the lower ends of the bolts 25, 26 and held in horizontal position by nuts 33, see FIGURE 1, threaded on the ends of the bolts. Surrounding each bolt is a compression coil spring 35 that functions to resiliently urge yoke 30 at its lowermost position seated on nuts 33. The springs 35 further serve as shock absorbers when the yoke 30 is moved upwardly as will be hereinafter described.

Carried on the forward terminal ends of yoke arms 28, 29 is a steering guide support 38 for a rear axle 40. The steering guide support 38 consists of a pair of lower arcuate plates 41, 42 and a pair of upper correspondingly arcuate plates 43, 44 all secured at their rear ends by bolts 45, 46 to the forward terminal ends of yoke arms 28, 29, see FIGURE 3. A cross arm 50 is formed integral with the central portions of upper arcuate plates 43, 44. The forward terminal ends of the upper and lower arcuate plates 43, 44 and 41, 42 respectively, are connected by spacer bolts 51, 52. It is to be noted that the upper and lower arcuate plates are vertically spaced apart and of similar shape. Positioned in the space between the arcuate support plates 41, 42 and 43, 44 is the rear axle 40.

Extending forwardly from the cross arm 50 and rigid therewith is a radius arm 55 that is upwardly bowed at its central portion. In line with and beneath the radius arm 55 is a steering arm 56 provided with a sleeve 57 that surrounds the center portion of the axle 40 and is secured thereto in any desired manner (not shown). A pivot bolt or pin 58 is mounted on cross arm 50 and extends through the cross arm 50 and the steering arm 56 at a point forwardly of sleeve 57, see FIGURE 4. Thus, the steering arm 56 may be pivoted about pivot pin 58 by horizontal swinging movement in either direction, as will be hereinafter described, by axle 40 which is guided and supported by the steering guide support 38.

The forward end of radius arm 55 has integrally formed therewith or otherwise rigidly secured thereto a front axle support bracket 60 consisting of lateral arms 61, 62 each having at its terminal end a forwardly extending arm 63, 64, respectively, the latter being provided with depending flanges 65, 66. Flanges 65, 66 are provided with transversely aligned openings 67, 68 for a front axle 70, see FIGURE 2.

At each end of rear axle 40 there is pivotally mounted thereon the lower end of a push pull arm 72, held in laterally fixed relation thereon by collars 73 and cotter pins 74. The push pull arms 72 extend upwardly in laterally spaced relation to chassis frame 12 with their upper ends substantially in the horizontal plane of chassis frame 12. The upper ends 75 of push pull arms 72 are rigidly connected and braced by a cross rod 76 having its terminal end portions projecting outwardly of the push-pull arms 72, see FIGURE 3. A holding bar 78 is pivotally connected at its rear end as by pin 79 to the center portion of cross rod 76. At its forward end, holding bar 78 is provided with an eye 80 that loosely fits over the upper terminal end portion of pedestal 20. The holding bar 78 serves to hold the push pull arms 72 in their proper inclined position which at the same time permitting turning thereof to effect swinging of rear axle 40 about pivot pin 58. Compression coil springs 82, 83 are each connected to a rear corner of chassis frame 12 and to the ends of cross rod 76, and serve to return the push pull arms 72 when swung in one or the other direction back to their normal position (presenting axle 40 in its normal transverse position). A pair of conventional handle arms 86, 87 are pivoted at their lower ends to the extended ends of cross-rod 76 and held in position thereon by a swingable latch 88 and suitable securing means (not shown). Latch 88 serves to lock handle arms 86, 87 to the push-pull arms 72 in their operative position. Release of both latches 88 will permit forward or downward folding of the handle arms. The handle arms 86, 87 are secured at their upper ends by a handle bar 89.

Rotatably mounted on the ends of the rear axle 40 are a pair of three-arm wheel structures 90 each disposed between a push-pull arm 72 and the steering guide support 38, see FIGURE 2. Each wheel structure 90 is formed of a pair of opposed three arm spiders 91, 92, joined by an axial hub 94 journaled on the axle 40. At the free ends of each of the spider arms and between the same is rotatably mounted a wheel 92.

Each forwardly extending arm 63, 64 is supported by a vertical brace 93, see FIGURE 1, connected at its lower end thereto and at its upper end to the corresponding front end of rectangular frame 14. Connected to each projecting end of front axle 70 is a bell-crank 96 having a lower arm 97 and an upstanding arm 98. A wheel support 100 embodying opposed three arm spiders similar in all respects to wheel support 90, carries wheels 102. Wheel supports 100 are each rotatably mounted on a stub shaft 104 carried by the terminal end of lower crank arm 97, as seen in FIGURE 1. Attached to each vertical brace 93 is a curved leaf spring bracket 106, and a tension coil spring 108 is provided for each bell-crank 96, being connected at its upper end to leaf spring bracket 106 and at its lower end to the upper terminal end of crank arm 98. Springs 108 function to hold the bell-cranks 96 in their proper position to insure level support for the carriage body 10 on wheel supports 100.

As will be obvious from the above described construction the baby carriage is steered by turning movement of the rear axle 40 in steering guide support 38, effected by selected turning of handle bars 86, 87 and push-pull bars 72. Springs 82 aid in returning the wheel supports 90 to their aligned position with front wheel supports 100. Springs 35 act as shock absorbers when the carriage is moved over bumps, depressions, etc. on the pavement or when going over curbs. Due to the free rotation of the front and rear wheel supports, the carriage may be moved upwardly or downwardly over a curb or up or down on the treads or risers of a stairway. Thus, to climb stairs S, rear wheel 92 will engage riser S' and as the carriage is pulled this will cause clockwise rotation of wheel supports 90 to bring upper wheel 92 onto tread T of stair S, and so on, with each wheel 92 in succession engaging the riser and the stair tread thereabove. In descending a stair the reverse action takes place. The same action also takes place when either going up or down over a curb.

While certain novel features of my invention have been shown and described and are pointed out in the annexed claims, it will be understood that various omissions, substitutions and changes in the forms and details of the device illustrated and in its operation can be made by those skilled in the art without departing from the spirit of the invention.

Having thus described my invention, I claim as new and desire to secure by Letters Patent:

1. A stair climbing vehicle comprising:
 (a) a rectangular chassis frame mounting a vehicle body thereon,
 (b) a vertical pedestal support depending from the rear side of said chassis frame and fixedly secured thereto,
 (c) a forwardly directed yoke resiliently suspended from the lower end of said pedestal support,
 (d) a steering guide support embodying laterally opposed vertically spaced guide arms connected to the free forward ends of said yoke,
 (e) a sleeve having a forward arm pivoted to said guide support centrally between said spaced guide arms,
 (f) a rear axle extending through said sleeve and secured thereto and between the spaced guide arms of said steering guide support,
 (g) a forwardly extending radius arm secured at its rear end to said steering guide support,
 (h) a support bracket at the front end of said radius arm having laterally opposed arms,
 (i) a front axle mounted on said laterally opposed arms,
 (j) a bell-crank rotatably mounted on each of the terminal ends of said front axle,
 (k) a three-arm spider wheel support having a rotatable wheel on the end of each arm rotatably carried by each bell-crank,
 (l) a like three-arm spider wheel support having a rotatable wheel on the end of each arm rotatably mounted on each of the terminal ends of said rear axle, and
 (m) push-pull arm means connected to the terminal ends of said rear axle to effect steering turning thereof about the pivot of said sleeve arm.

2. The stair climbing vehicle of claim 1, wherein:
 (a) a pair of laterally spaced depending bolts supports the bight portion of said forwardly directed yoke from the lower end of said vertical pedestal support, and
 (b) a compression coil spring surrounding each bolt and bearing against said bight portion and the lower end of said pedestal support.

3. The stair climbing vehicle of claim 2, wherein said push-pull arm means comprises:
 (a) a pair of arms each pivotally connected at its lower end to a corresponding terminal end of the rear axle,
 (b) a cross rod rigidly connected at its ends to the upper ends of said arms, and
 (c) a holding bar provided with an eye at its forward end encircling the upper end portion of said pedestal and pivotally connected at its rear end centrally to said cross rod.

4. The stair climbing vehicle of claim 3, including:
 (a) a coil spring connected to each rear corner of said chassis rectangular frame and to a corresponding end of said cross bar,
 (b) handle bar means pivotally connected at their lower ends to the upper ends of said push-pull arms, and
 (c) latch means on each push-pull arm engageable with said handle bar means for locking the same in operative alignment with said push-pull arms and when unlocked permitting downward folding of the handle bar means to an inoperative position.

5. The stair climbing vehicle of claim 4, wherein said steering guide support comprises:
   (a) a pair of vertically spaced upper and lower laterally opposed arcuate bars,
   (b) spacer bolt means connecting the front and rear ends of said arcuate bars,
   (c) said spacer bolt means at the rear of said arcuate bar connecting the same to the forward ends of said yoke,
   (d) a horizontal cross arm rigidly connected at its ends centrally to the upper of said pair of laterally opposed arcuate bars, and
   (e) the forward arm of said sleeve being pivotally connected by a steering pin centrally to said cross arm.

6. The stair climbing vehicle of claim 5, wherein:
   (a) said radius arm is rigidly secured at its rear end and is upwardly bowed intermediate its ends.

7. The stair climbing vehicle of claim 6, wherein said radius arm at its forward end includes:
   (a) a pair of transversely aligned lateral arms,
   (b) each arm at its terminal end having a forwardly extending bracket,
   (c) a depending flange on each bracket,
   (d) a front axle supported by said depending flanges having terminal end portions extending outwardly of said flanges, and
   (e) said bell-cranks being each mounted on a terminal end portion of said front axle.

8. The stair climbing vehicle of claim 7, wherein:
   (a) each said bell-crank comprises an upstanding arm and a substantially horizontal arm,
   (b) a stub shaft carried at the free end of said horizontal arm, and
   (c) said front three arm spider wheel supports being each rotatably mounted on a corresponding stub shaft.

9. The stair climbing vehicle of claim 8, including:
   (a) a vertical brace connected at its lower end to the forwardly extending bracket of the radius arm and at its upper end to a corresponding forward corner of said chassis rectangular frame.

10. The stair climbing vehicle of claim 9, including:
   (a) a curved leaf spring connected to each vertical brace, and
   (b) a tension coil spring for each bell-crank each connected at its upper end to a corresponding leaf spring and at its lower end to the upper terminal end of the upstanding arm of an associated bell-crank.

References Cited

UNITED STATES PATENTS

| | | | |
|---|---|---|---|
| 1,887,427 | 11/1932 | Porcello | 280—5.28 |
| 2,014,060 | 9/1935 | Albrecht | 280—87.03 X |
| 3,269,741 | 8/1966 | Porcello | 280—5.26 |

FOREIGN PATENTS

| | | |
|---|---|---|
| 650,856 | 8/1928 | France. |

LEO FRIAGLIA, Primary Examiner